US006848970B2

(12) United States Patent
Manens et al.

(10) Patent No.: US 6,848,970 B2
(45) Date of Patent: Feb. 1, 2005

(54) PROCESS CONTROL IN ELECTROCHEMICALLY ASSISTED PLANARIZATION

(75) Inventors: Antoine P. Manens, Palo Alto, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 141 days.

(21) Appl. No.: 10/244,688

(22) Filed: Sep. 16, 2002

(65) Prior Publication Data

US 2004/0053512 A1 Mar. 18, 2004

(51) Int. Cl.[7] .............................................. B24B 49/00
(52) U.S. Cl. ............................................ 451/5; 451/36
(58) Field of Search ............................. 451/36, 41, 104, 451/113, 285–288, 5, 10, 11, 54, 57

(56) References Cited

U.S. PATENT DOCUMENTS

| | | | |
|---|---|---|---|
| 3,162,588 A | 12/1964 | Bell | ........................... 204/141 |
| 3,873,512 A | 3/1975 | Latanision | ............. 204/129.46 |
| 4,125,444 A | 11/1978 | Inoue | ..................... 204/129.43 |
| 4,793,895 A | 12/1988 | Kaanta et al. | .............. 156/627 |
| 4,839,993 A | 6/1989 | Masuko et al. | ............... 51/129 |
| 4,954,141 A | 9/1990 | Takiyama et al. | ............. 51/296 |
| 4,956,056 A | 9/1990 | Zubatova et al. | ...... 204/129.43 |
| 5,096,550 A | 3/1992 | Mayer et al. | |
| 5,136,817 A | 8/1992 | Tabata et al. | ............. 51/165.71 |
| 5,543,032 A | 8/1996 | Datta et al. | .................. 205/670 |
| 5,567,300 A | 10/1996 | Datta et al. | .................. 205/652 |
| 5,575,706 A | 11/1996 | Tsai et al. | ...................... 451/129 |
| 5,578,362 A | 11/1996 | Reinhardt et al. | ........... 428/147 |
| 5,637,031 A * | 6/1997 | Chen | ............................ 451/41 |
| 5,738,574 A | 4/1998 | Tolles et al. | ................. 451/288 |

| | | | |
|---|---|---|---|
| 5,804,507 A | 9/1998 | Perlov et al. | ................ 438/692 |

(List continued on next page.)

FOREIGN PATENT DOCUMENTS

| | | | |
|---|---|---|---|
| EP | 0 325 753 | 8/1989 | ........... H01L/21/00 |
| JP | 11042554 | 2/1999 | ........... B24B/37/04 |
| JP | 2001-77117 | 3/2001 | ....... H01L/21/3205 |
| WO | WO 98/49723 | 11/1998 | ......... H01L/21/321 |
| WO | WO 99/41434 | 8/1999 | ............ C25D/5/02 |
| WO | WO 99/53119 | 10/1999 | ........... C23C/18/18 |
| WO | WO 00/03426 | 1/2000 | ......... H01L/21/321 |
| WO | WO 00/26443 | 5/2000 | |
| WO | WO 00/33356 | 6/2000 | |
| WO | WO 00/59682 | 10/2000 | ........... B24B/37/04 |
| WO | WO 01/49452 | 7/2001 | ........... B24B/37/04 |
| WO | WO 01/88229 | 11/2001 | ............. C25F/3/30 |
| WO | WO 02/23616 | 3/2002 | ........... H01L/21/44 |
| WO | WO 02/064314 | 8/2002 | ........... B24B/37/04 |
| WO | WO 03/001581 A2 | 1/2003 | |

OTHER PUBLICATIONS

PCT Written Opinion for PCT/US03/01760 dated Mar. 8, 2004 (AMAT/6339.PC.).

(List continued on next page.)

Primary Examiner—David B. Thomas
(74) Attorney, Agent, or Firm—Moser, Patterson & Sheridan

(57) ABSTRACT

Aspects of the invention generally provide a method for polishing a material layer using electrochemical deposition techniques, electrochemical dissolution techniques, polishing techniques, and/or combinations thereof. In one aspect of the invention, the polishing method comprises applying a separate electrical bias, such as a voltage, to each of a plurality of zones of an electrode. Determining the separate biases comprises determining a time that at least one portion of the material layer is associated with each of the zones of the counter-electrode.

20 Claims, 8 Drawing Sheets

U.S. PATENT DOCUMENTS

| | | | | |
|---|---|---|---|---|
| 5,807,165 | A | 9/1998 | Uzoh et al. | 451/41 |
| 5,846,882 | A | 12/1998 | Birang | 438/692 |
| 5,871,392 | A | 2/1999 | Meikle et al. | 451/56 |
| 5,911,619 | A | 6/1999 | Uzoh et al. | 451/5 |
| 5,938,801 | A | 8/1999 | Robinson | 51/306 |
| 6,001,008 | A | 12/1999 | Fujimori et al. | 451/443 |
| 6,004,880 | A | 12/1999 | Liu et al. | 438/692 |
| 6,017,265 | A | 1/2000 | Cook et al. | 451/41 |
| 6,024,630 | A | 2/2000 | Shendon et al. | 451/41 |
| 6,066,030 | A | 5/2000 | Uzoh | 451/41 |
| 6,090,239 | A | 7/2000 | Liu et al. | 156/345 |
| 6,103,096 | A | 8/2000 | Datta et al. | 205/686 |
| 6,116,998 | A | 9/2000 | Damgaard et al. | 451/490 |
| 6,153,043 | A | 11/2000 | Edelstein et al. | 156/345 |
| 6,156,124 | A | 12/2000 | Tobin | 118/719 |
| 6,159,079 | A | 12/2000 | Zuniga et al. | 451/41 |
| 6,171,467 | B1 | 1/2001 | Weihs et al. | 205/93 |
| 6,176,992 | B1 | 1/2001 | Talieh | 205/87 |
| 6,210,257 | B1 | 4/2001 | Carlson | 451/56 |
| 6,234,870 | B1 | 5/2001 | Uzoh et al. | 451/8 |
| 6,238,271 | B1 | 5/2001 | Cesna | 451/41 |
| 6,244,935 | B1 | 6/2001 | Birang et al. | 451/41 |
| 6,248,222 | B1 | 6/2001 | Wang | 204/297.09 |
| 6,273,798 | B1 | 8/2001 | Berman | 451/72 |
| 6,297,159 | B1 | 10/2001 | Paton | 438/693 |
| 6,358,118 | B1 * | 3/2002 | Boehm et al. | 451/24 |
| 6,379,223 | B1 * | 4/2002 | Sun et al. | 451/41 |
| 6,381,169 | B1 | 4/2002 | Bocian et al. | 365/151 |
| 6,386,956 | B1 | 5/2002 | Sato et al. | 451/57 |
| 6,391,166 | B1 | 5/2002 | Wang | 204/224 R |
| 6,395,152 | B1 | 5/2002 | Wang | 204/224 M |
| 6,440,295 | B1 | 8/2002 | Wang | 205/640 |
| 6,582,281 | B2 * | 6/2003 | Doan et al. | 451/41 |
| 6,612,904 | B1 * | 9/2003 | Boehm et al. | 451/24 |
| 2001/0024878 | A1 | 9/2001 | Nakamura | 438/691 |
| 2001/0027018 | A1 | 10/2001 | Molnar | |
| 2001/0036746 | A1 | 11/2001 | Sato et al. | 438/745 |
| 2001/0040100 | A1 | 11/2001 | Wang | 205/220 |
| 2001/0042690 | A1 | 11/2001 | Talieh | 205/118 |
| 2002/0008036 | A1 | 1/2002 | Wang | 205/118 |
| 2002/0025760 | A1 | 2/2002 | Lee et al. | |
| 2002/0070126 | A1 | 6/2002 | Sato | 205/640 |
| 2002/0077037 | A1 | 6/2002 | Tietz | 451/41 |

OTHER PUBLICATIONS

PCT International Search Report for PCT/US03/01760 dated May 27, 2003 (AMAT/6339.PC.).

Contolini, et al. "Electrochemical Planarization of ULSI Copper" Solid State Technology pp. 1–7.

PCT International Search Report for PCT/US03/29230, dated Feb. 3, 2004 (AMAT/6874PCT).

Nogami, "An Innovation in Integrate Porous Low–K Materials and Copper," *InterConnect Japan 2001*; Honeywell Seminar Dec. 6, 2001, p 1–12.

U.S. Appl. No. 10/163,796.
U.S. Appl. No. 10/151,538.
U.S. Appl. No. 10/141,459.
U.S. Appl. No. 10/038,066.
U.S. Appl. No. 10/033,732.
U.S. Appl. No. 10/032,275.

* cited by examiner

PROCESS CONTROL IN ELECTROCHEMICALLY ASSISTED PLANARIZATION

CROSS-REFERENCE TO RELATED APPLICATIONS

This application is related to co-pending application Ser. No. 10/244,697, filed Sep. 16, 2002, entitled "Control Of Removal Profile In Electrochemically Assisted CMP," commonly assigned with the present invention and herein incorporated by reference in its entirety.

BACKGROUND OF THE INVENTION

1. Field of the Invention

Embodiments of the present invention relate to a method and apparatus for planarizing a surface and, more particularly, to a method of controlling the removal rate of material in electrochemically assisted chemical mechanical polishing (ECMP).

2. Background of the Related Art

Sub-quarter micron multi-level metallization is one of the key technologies for the next generation of ultra large-scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the substrate may become non-planar across its surface and require planarization. "Planarizing" a surface, or "polishing" a surface, is a process where material is removed from the surface of the substrate to form a generally even, planar surface. Planarization is useful in removing undesired surface topography and surface defects, such as agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical polishing (CMP) is a common technique used to planarize substrates. CMP utilizes a chemical composition, typically a slurry or other fluid medium, for selective removal of material from substrates. In conventional CMP techniques, a pad is moved relative to the substrate by an external driving force. The CMP apparatus effects polishing or rubbing movement between the surface of the substrate and the polishing pad while dispersing a polishing composition to effect chemical activity and/or mechanical activity and consequential removal of material from the surface of the substrate.

One material increasingly utilized in integrated circuit fabrication is copper due to its desirable electrical properties. However, copper has its own special fabrication problems. Copper material is removed at different removal rates along the different surface topography of the substrate surface, which makes effective removal of copper material from the substrate surface and planarity of the substrate surface difficult to achieve. For example, in one common non-uniformity pattern, copper may be removed slower or faster at the edge and the center of the substrate when compared to an intermediate region of the substrate.

One solution for polishing a material such as copper is by using electrochemical mechanical polishing (ECMP) techniques. ECMP techniques remove conductive material from a substrate surface by electrochemical dissolution while concurrently polishing the substrate with reduced mechanical abrasion compared to conventional CMP processes. The electrochemical dissolution is performed by applying an electrical bias between an electrode and a substrate surface to remove conductive materials from a substrate surface into a surrounding electrolyte. During electrochemical dissolution, the substrate typically is placed in motion relative to a polishing pad to enhance the removal of material from the surface of the substrate. In one embodiment of an ECMP system, the electrical bias is applied by a ring of conductive contacts in electrical communication with the substrate surface in a substrate support device, such as a substrate carrier head. In other ECMP systems, a bias is applied between an electrode and conductive pad that is in contact with the substrate surface. Unfortunately, these conventional ECMP systems fail to provide an ECMP method for polishing a substrate that delivers a uniform or predictable polishing rate (i.e. providing a rate of material removal that can be controlled) across the surface of the substrate.

As a result, there is a need for a method of controlling the rate of material removal during ECMP.

SUMMARY OF THE INVENTION

Aspects of the invention generally provide a method for polishing a material layer using electrochemical deposition techniques, electrochemical dissolution techniques, polishing techniques, and/or combinations thereof. In one aspect of the invention, the polishing method comprises separately applying a plurality of biases between a material layer and a plurality of zones of an electrode. The electrode is generally a counter-electrode to the material layer and may comprise a plurality of conductive elements separated by a dielectric material.

The determination of the separate biases comprises determining a time that at least one portion of the material layer is associated with each of the zones of the counter-electrode. A polishing program used to polish the material layer encodes, for example, a sequence of relative positions or relative motion between the counter-electrode and the material layer. Based upon the polishing program, an algorithm may be used to calculate a time period that a point on the material layer is associated with each of the zones of the counter-electrode. The bias applied to the zones of the counter-electrode may be selected to match a desired material removal profile. The desired removal profile may be, for example, a uniform profile, i.e., one that does not vary across the surface to be polished. Alternatively, the removal profile may be non-uniform, so as to, for example, compensate for a substrate or material layer that is uneven.

An optimization, such as a statistical optimization may be performed to determine the optimal bias that should be associated with each zone of the counter-electrode. The optimization may be performed in order to substantially match the desired removal profile. The biases to be applied to each zone of the counter-electrode may be selected using a relationship, such as a pre-determined relationship, between bias applied to the material layer and the rate of material removal from the material layer.

In one aspect, a method is provided for processing a substrate including disposing a substrate containing a conductive material layer in a process apparatus comprising an electrode having a plurality of zones, moving the substrate relative to the plurality of zones with at least one portion of the substrate passes through more than one zone of the plurality of zones, applying a bias to each of the plurality of zones, wherein the bias to each of the plurality of zones is modified by the time that the at least one portion of the substrate layer is associated with more than one zone of the electrode, and removing conductive material from the conductive material layer.

In another aspect, a method is provided for processing a surface of a material layer including disposing a substrate containing a conductive material layer in a process apparatus comprising an electrode having a plurality of zones and a polishing pad having a plurality of zones corresponding to the plurality of zones of the electrode, providing relative motion between the polishing pad and the substrate, and separately applying a plurality of biases between the plurality of zones of the polishing pad and the plurality of zones of the counter-electrode, wherein the plurality of biases removes conductive material from the conductive material layer at a rate that varies for each of the plurality of zones of the polishing pad.

In another aspect, a method of polishing a surface of a material layer comprises providing relative motion between the material layer and a counter-electrode. The material layer is contacted with a polishing pad. During at least a portion of the relative motion, a plurality of biases are separately applied between a material layer and a plurality of zones of an electrode. The determination of the separate biases comprises determining a distribution of times that at least one portion of the material layer is associated with each of the zones of the counter-electrode.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1A:
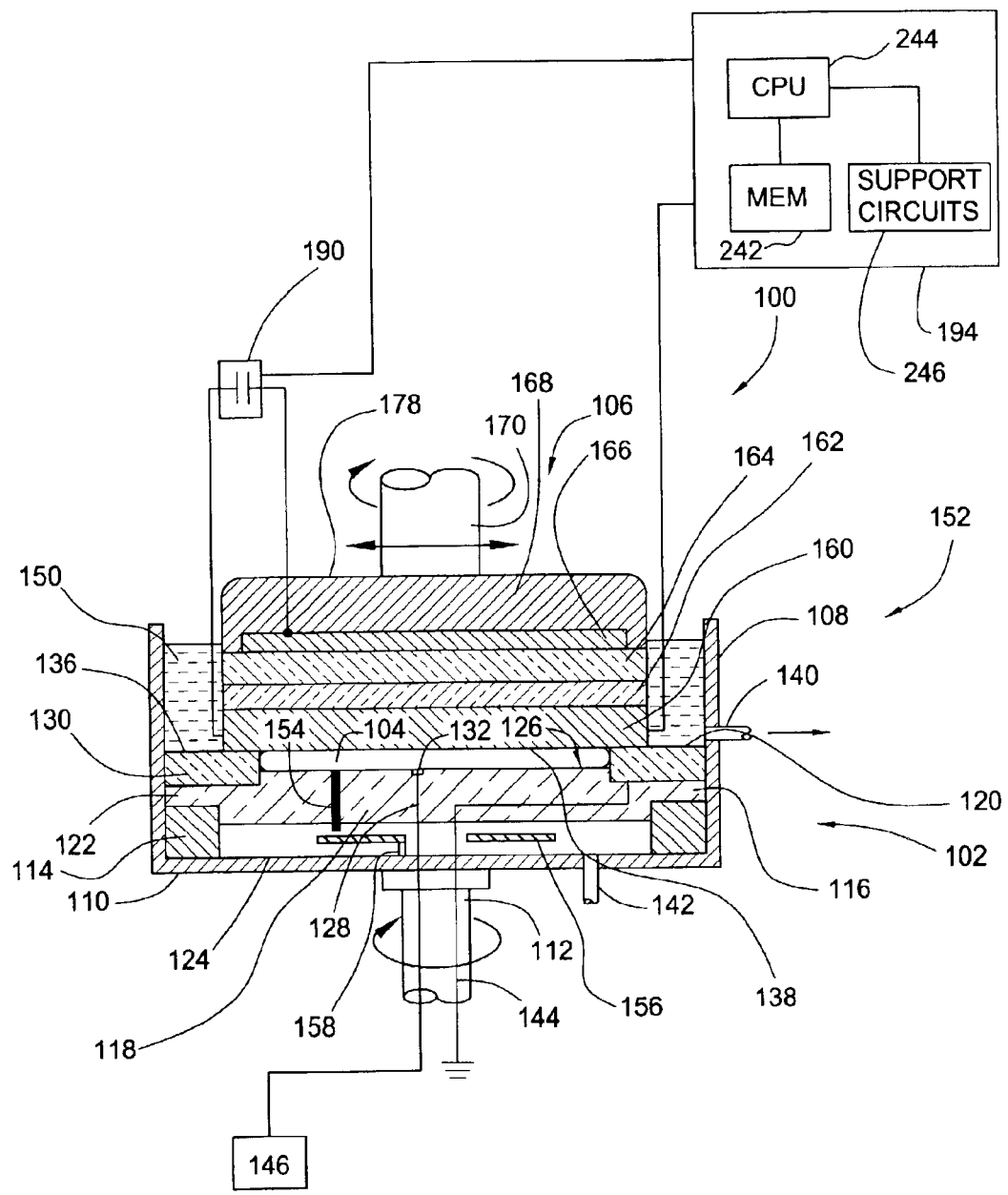
FIG. 1A is a sectional view of one embodiment of a processing cell that may be used to practice embodiments described herein.

FIG. 1A depicts a sectional view of one embodiment of a process cell 100 in which at least one or more processes including plating and polishing, or combinations thereof may be practiced. The process cell 100 may be used to practice electrochemical mechanical polishing (ECMP). ECMP should be broadly construed and includes, but is not limited to, planarizing a substrate by the application of electrochemical activity or a combination of both electrochemical and mechanical activity to remove material from a substrate surface. The process cell 100 may be used to polish a substrate through an anodic dissolution process. In an anodic dissolution process, an anodic bias is applied to the substrate, directly or indirectly, resulting in removal of conductive material from a substrate surface into a surrounding electrolyte. The process cell 100 may also be used to electrochemically deposit material onto a substrate. The electrochemical deposition may be concurrent with the application of various forms of activity used to polish the substrate. The concurrent activity may be electrochemical activity, mechanical activity, or a combination of both electrochemical and mechanical activity, such as are used in an electrochemical mechanical plating process (ECMPP).

The process cell 100 generally includes a basin assembly 152 and a polishing head 106. A substrate 104 may be retained in the basin assembly 152 during processing in a face-up (e.g., backside down) orientation. An electrolyte is flowed over a feature side 138 (surface) of the substrate 104 during processing. The polishing head 106 is placed in contact with the substrate 104, and the polishing head 106 and the substrate are moved relative to each other to provide a polishing motion. The polishing motion generally comprises at least one motion defined by an orbital, rotary, linear or curvilinear motion, or combinations thereof, among other motions. The polishing motion may be achieved by moving either or both of the polishing head 106 and the basin assembly 152.

The basin assembly 152 generally includes a basin 102 having a substrate support or carrier 116 disposed therein. The carrier 116 generally supports the substrate 104 within the basin 102 during processing. The basin 102 is generally non-electrically conductive and can be a bowl shaped member made of a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing. The basin 102 generally includes sidewalls 108 and a bottom 110 that generally defines a container or electrolyte cell in which a conductive fluid such as the electrolyte can be confined. The bottom 110 generally includes a drain 142 to facilitate removal of fluids from the bottom of the basin 102, while the sidewalls 108 generally include an outlet 140 to facilitate removal of excess electrolyte from the basin 102 during processing.

The basin 102 may be stationary or be driven to provide at least a portion of a relative motion between the substrate 104 and the polishing head 106. In the embodiment depicted in FIG. 1A, an optional shaft 112 is coupled to the bottom 110 of the basin 102 and is coupled to a drive system (not shown) to provide the basin 102 with a rotary, orbital, sweep motion or a motion comprising combinations thereof, among other motions. The shaft 112 additionally provides a conduit for ground leads 144 and other control or supply lines to be routed into or out of the basin 102. In embodiments wherein the basin 102 is rotated by the shaft 112, the drain 142 may also be routed through the shaft 112.

A spacer 114 is disposed on the bottom 110 of the basin 102. The spacer 114 is typically annular in form and is comprised of a material compatible with process chemistries. In one embodiment, the spacer 114 is fabricated from the same material as the basin 102. The spacer 114 may optionally be fabricated with the basin 102 as a single member from a unitary mass of material.

The carrier 116 is generally disposed in the basin 102 and supported by the spacer 114. The carrier 116 is typically fabricated from a dielectric material such as a polymer or a ceramic material. The carrier 116 generally includes a first side 118 and a second side 120. The first side 118 includes a flange 122 substantially circumscribing a projecting center section 124. The flange 122 is disposed on the spacer 114 and supports the carrier 116 above the bottom 110 of the basin 102. The center section 124 projects into the open area defined within the spacer 114 to locate the carrier 116 within the basin 102 and prevent movement of the carrier 116 during processing.

The second side 120 of the carrier 116 includes a projecting support surface 126 that extends towards the top of the basin 102. The support surface 126 generally supports the substrate 104 during processing. The support surface 126 includes at least one vacuum port 132 formed therein and coupled to a vacuum passage 128 disposed through the carrier 116. The vacuum passage 128 is fluidly coupled through the shaft 112 to a vacuum source 146. Vacuum, drawn through the vacuum port 132, retains the substrate 104 on the support surface 126 during processing. Optionally, the support surface 126 may include topography that enhances the distribution of vacuum between the substrate 104 and support surface 126 so that the substrate 104 is uniformly pulled towards the carrier 116.

A plurality of lift pins 154 (only one is shown for clarity) is disposed through respective holes formed through the carrier 116. A lift plate 156 disposed between the carrier 116 and the chamber bottom 110 is coupled to an actuator rod 158. The actuator rod 158 is routed through the shaft 112 to a lift mechanism (not shown). The lift mechanism may be actuated to move the rod 158 and lift plate 156 towards the carrier 116. The lift plate 156 contacts the pins 154 and causes the pins 154 to extend above the support surface 126 of the carrier 116, thus placing the substrate 104 in a spaced-apart relation relative to the carrier 116 that facilitates access to the substrate 104 by a substrate transfer device (not shown).

An annular retaining ring 130 is generally disposed on the flange 122 of the carrier 116. The retaining ring 130 generally snugly circumscribes and extends above a plane of the support surface 126. The thickness of the retaining ring 130 is configured so that a top surface 136 of the retaining ring 130 is substantially co-planar (i.e., within about ±1 mil) with the feature side 138 of the substrate 104 to be processed. The sidewalls 108 generally extend above the retaining ring 130 to define a processing area 150. The outlet 140 is typically located in the sidewall 108 near the elevation of the top surface 136 of the retaining ring 130 to allow the removal of electrolyte from the processing area 150 during or after processing. During processing, the outlet 140 is closed and the basin 102 is substantially full of electrolyte.

The top surface 136 of the retaining ring 130 is typically fabricated from a material that does not adversely affect the polishing head 106 which may periodically contact the top surface 136. In one embodiment, the retaining ring 130 is fabricated from a material compatible with processing chemistries, for example, a thermoplastic such as polyphenylene sulfide (PPS) among other polymers. The retaining ring 130 may be grounded by the ground lead 144 that is routed out of the process cell 100 through the shaft 112. If the retaining ring 130 is a thermoplastic or other dielectric, there is no need to ground it since it is an electrical insulator.

Alternatively, the ring 130 may be metallic to promote uniformity across the wafer (particularly at the edge of the substrate). For example, an ungrounded copper retaining ring 130 may be used that has the same potential as the substrate during processing.

The polishing head 102 generally includes a pad 160, an optional membrane 162, a support disk 164 and a counter-electrode 166 coupled to a housing 168. The pad 160 is generally exposed at the bottom of the polishing head 102 and contacts the substrate 104 and, in some embodiments, the retaining ring 130 during processing. The pad 160 may have one or more conductive elements formed therein. The membrane 162 is sandwiched between the pad 160 and the support disk 164. The counter-electrode 166 is disposed between the support disk 164 and the interior of the housing 168. The pad 160, membrane 162, disk 164 and the counter-electrode 166 are permeable, perforated, or contain passages formed therethrough that allow the electrolyte to flow into and out of the polishing head 102.

The polishing head 106 may be stationary or driven to provide at least a portion of the relative motion between the substrate 104 and the polishing head 106. In the embodiment depicted in FIG. 1A, the housing 168 is coupled to a drive system (not shown) by a column 170. The drive system moves the column 170 thereby providing the polishing head 106 with a rotary, orbital, sweep motion or a motion comprising combinations thereof, among other motions. The column 170 additionally provides a conduit for electrical leads and other control or supply lines to be routed into or out of the polishing head 106.

The housing 168 is generally fabricated from a rigid material compatible with process chemistries. The housing 168 generally includes a top 178 which is coupled to the column 170 and sides 180 extending therefrom. The sides 180 typically are coupled to the support disk 164, enclosing the counter-electrode 166 within the housing 168. A plurality of spacing members (not shown) generally extend from the top 178 into the interior of the housing 168. The spacing members keep the counter-electrode 166 in a spaced-apart relation relative to the top 178. The spacing members generally support the counter-electrode 166 in an orientation parallel to the surface of the substrate 104. The spacing members are configured to allow fluids to move laterally within the housing 168.

The counter-electrode 166 and the substrate 104 define a region between which electrical biases (e.g. potential differences) are established. The biases may be applied between the counter electrode 166 and the pad 160 that is placed in contact with a material layer that is formed on the substrate 104. The pad 160 may be at least partially conductive and may act as an electrode in combination with the substrate 104 during electrochemical processes, such as an electrochemical mechanical plating process (ECMPP), which includes electrochemical deposition and chemical mechanical polishing, or electrochemical dissolution. The counter-electrode 166 may be an anode or cathode depending upon the positive bias (anode) or negative bias (cathode) applied between the counter-electrode 166 and the pad 160.

For example, when depositing material from an electrolyte onto the substrate surface, the counter-electrode 166 acts as an anode and the substrate surface and/or the pad 160 acts as a cathode. A reaction takes place at the cathode causing material to deposit on the substrate surface. When removing material from a substrate surface, the counter-electrode 166 functions as a cathode and the substrate surface and/or conductive pad 160 acts as an anode. The removal may result from material on the substrate surface dissolving into the surrounding electrolyte due to the application of the electrical bias.

The electrolyte within the basin 102 is maintained at a level that ensures that the lower surface of the counter-electrode 166 is immersed in the electrolyte during processing. The counter-electrode 166 is permeable to the electrolyte and gases, and can be a plate-like member, a plate having multiple holes formed therethrough or a plurality of counter-electrode pieces disposed in a permeable membrane or container.

The counter-electrode 166 typically is comprised of the material to be deposited or removed, such as copper, aluminum, gold, silver, tungsten and other materials which can be electrochemically deposited on the substrate 104. For electrochemical removal processes, such as anodic dissolution, the counter-electrode 166 may include a non-consumable electrode of a material other than the deposited material, such as platinum for copper dissolution. The non-consumable electrode is used in planarization processes combining both electrochemical deposition and removal.

Figure 2:
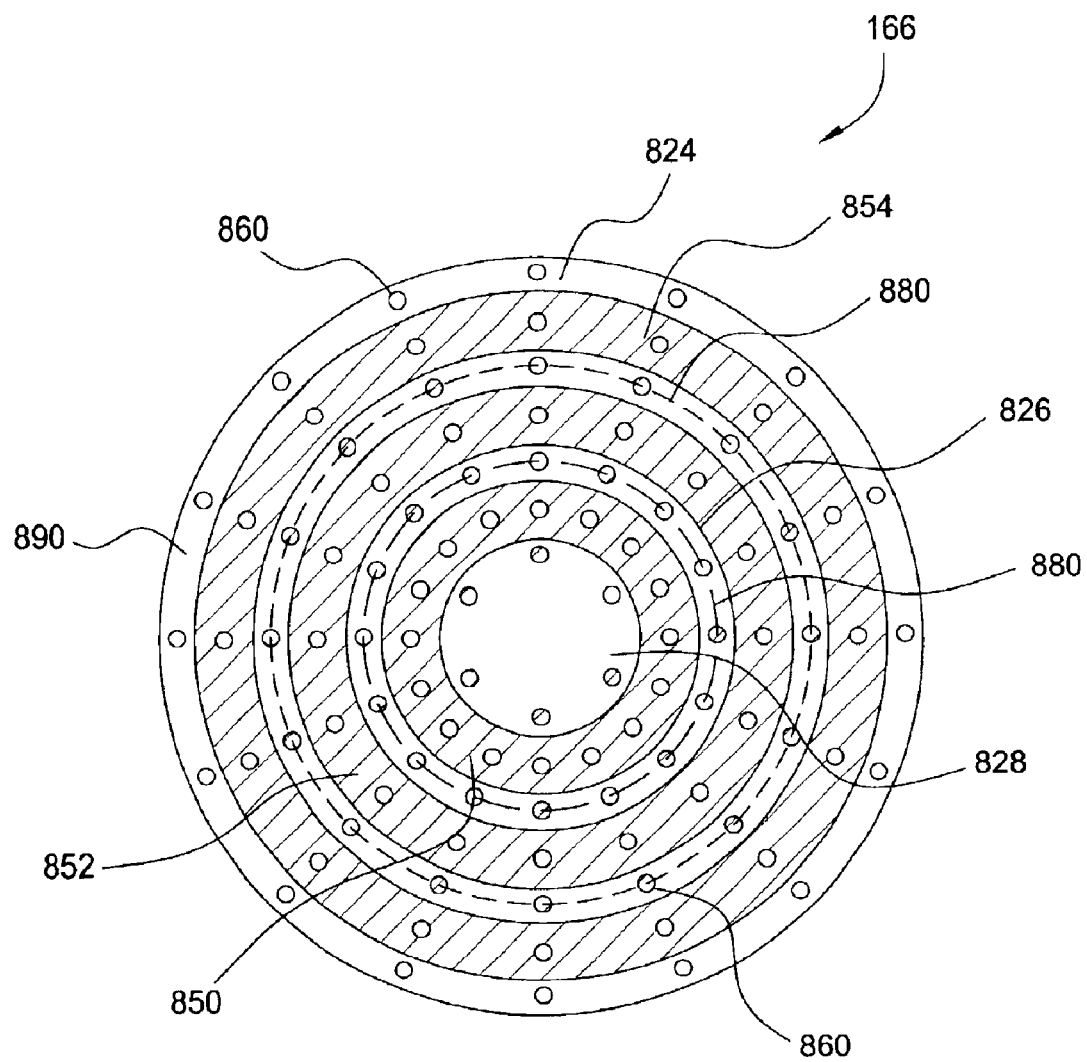
FIG. 2 is a bottom view of a counter-electrode that may be used to practice embodiments described herein.

FIG. 2 shows a bottom view of a counter-electrode 166 consistent with embodiments of the invention described hererin. The counter-electrode has a surface 890 that generally is positioned to face the surface 138 of the material layer 105 to be polished. The counter-electrode 166 may be characterized as having a plurality of distinct zones. Three zones, an outer zone 824, an intermediate zone 826, and an inner zone 828 are shown by way of example in FIG. 2 (the zones 824, 826, 828 are separated by zone boundaries 880 that are shown in phantom in FIG. 2).

Each zone of the counter-electrode 166 generally comprises at least one conductive element (three conductive elements 850, 852, 854 are shown by way of example in FIG. 2) that is electrically isolated from the conductive elements in the other zones. Each conductive element may be, for example, a ring or a radially-oriented conductive element. Alternatively, other shapes and orientations, such as linear, curved, concentric, involute curves or other shapes and orientations are possible for the conductive elements. The conductive elements may be of substantially equal sizes and shapes from one zone to the next, or the sizes and shapes may vary depending upon the particular zone of concern. So that the zones may be separately biased, the conductive elements are separated by insulating material such as a solid, liquid, or gaseous (e.g. air) dielectric material, or combinations thereof. The counter electrode 166 may have perforations 860 therethrough to facilitate the flow of electrolyte through the counter-electrode 166.

Referring again to FIG. 1A, the support disk 164 is perforated or permeable to the electrolyte and gases. The support disk 164 is made from a material compatible with the electrolyte that would not detrimentally affect polishing. The support disk 164 may be fabricated from a non-electrically conductive polymer, for example fluoropolymers, TEFLON® polymers, perfluoroalkoxy resin, PFA, polyethylene-based plastics, PE, sulfonated polyphenylether sulfones, PES, high density polyethylene, HDPE, ultra-high molecular weight (UHMW) polyethylene, or other materials that are compatible or non-reactive with electrolyte compositions that may be used in electroplating or electropolishing. The support disk 164 is typically secured in the housing 168 of the polishing head 106 using adhesives, fasteners or other devices or methods that substantially ensure the parallelism of the support disk 164 and the carrier 116. The support disk 164 may be spaced from the counter-electrode 166 to provide a wider process window, thus reducing the sensitivity of depositing material and removing material from the substrate surface to the counter-electrode 166 dimensions.

In one embodiment, the support disk 164 includes a plurality of perforations or channels (not shown) formed therein. The size and density of the channels are selected to provide uniform distribution of the electrolyte through the support disk 164 to the substrate 104. In one aspect, the support disk 164 includes channels having a diameter between about 0.5 mm and about 10 millimeters. The channels may have a density between about 30% and about 80% of an area of the support disk 164 that faces the substrate 104. A channel density of about 50% has been observed to provide electrolyte flow with minimal detrimental effects to polishing processes. Generally, the channels of the support disk 164 and the pad 160 may be aligned to provide for sufficient mass flow of electrolyte through the support disk 164 and the pad 160 to the substrate surface.

To facilitate control of polishing uniformity, a microprocessor controller 194, as shown in FIG. 1A may be electrically coupled to the various components of the process cell 100. The controller 194 comprises a central processing unit (CPU) 244, a memory 242, and support circuits 246 for the CPU 244. The CPU 244 may be one of any form of general purpose computer processor that can be used in an industrial setting for controlling various process equipment and sub-processors. The memory 242 is coupled to the CPU 244. The memory 242, or computer-readable medium, may be one or more of readily available memory such as random access memory (RAM), read only memory (ROM), floppy disk, hard disk, or any other form of digital storage, local or remote. The support circuits 246 are coupled to the CPU 244 for supporting the processor in a conventional manner. These circuits include cache, power supplies, clock circuits, input/output circuitry and subsystems, and the like. A polishing process is generally stored in the memory 242 as a software routine. The software routine may also be stored and/or executed by a second CPU (not shown) that is remotely located from the hardware being controlled by the CPU 244.

The software routine is executed after the substrate is positioned in the process cell 100. The software routine when executed by the CPU 244, transforms the general purpose computer into a specific purpose computer (controller) 194 that controls the chamber operation such that the etching process is performed. Although the process of the present invention is discussed as being implemented as a software routine, some of the method steps that are disclosed therein may be performed in hardware as well as by the software controller 194. As such, the invention may be implemented in software as executed upon a computer system, in hardware as an application specific integrated circuit or other type of hardware implementation, or a combination of software and hardware.

The membrane 162 is generally permeable, thereby allowing the electric field lines, electrolyte and other liquids and gases to pass therethrough. The membrane 162 generally prevents particles or sludge released from the counter-electrode 166 from passing through the electrolyte and contacting the substrate 104. The membrane 162 is typically fabricated from a porous ceramic or polymer that is compatible with process chemistries and does not increase the cell resistance. For example, a spunbonded polyolefin (such as TYVEK®, available from E.I. DuPont de Nemours Inc. of Wilmington, Del.) may be used.

The pad 160 can be a pad, a web or a belt of material, which is compatible with the fluid environment and the processing specifications. In the embodiment depicted in FIG. 1A, the pad 160 is circular in form and is adhered or otherwise retained to the membrane 162 at the bottom of the polishing head 106 opposite the housing 168 of the polishing head 106. The pad 160 may include one or more conductive elements (not shown in FIG. 1A) for contacting the feature side 138 of the material layer 105 during processing. A backing material (not shown) may be disposed between the membrane 162 and the pad 160 to tailor the compliance and/or durometer of the pad 160 during processing. Examples of a conductive pad that may be adapted to benefit from the invention are disclosed in U.S. patent application Ser. No. 10/033,732, filed Dec. 27, 2001, which paragraphs 41–157 are incorporated herein incorporated by reference to the extent not inconsistent with the claims aspects and description herein..

Figure 3:
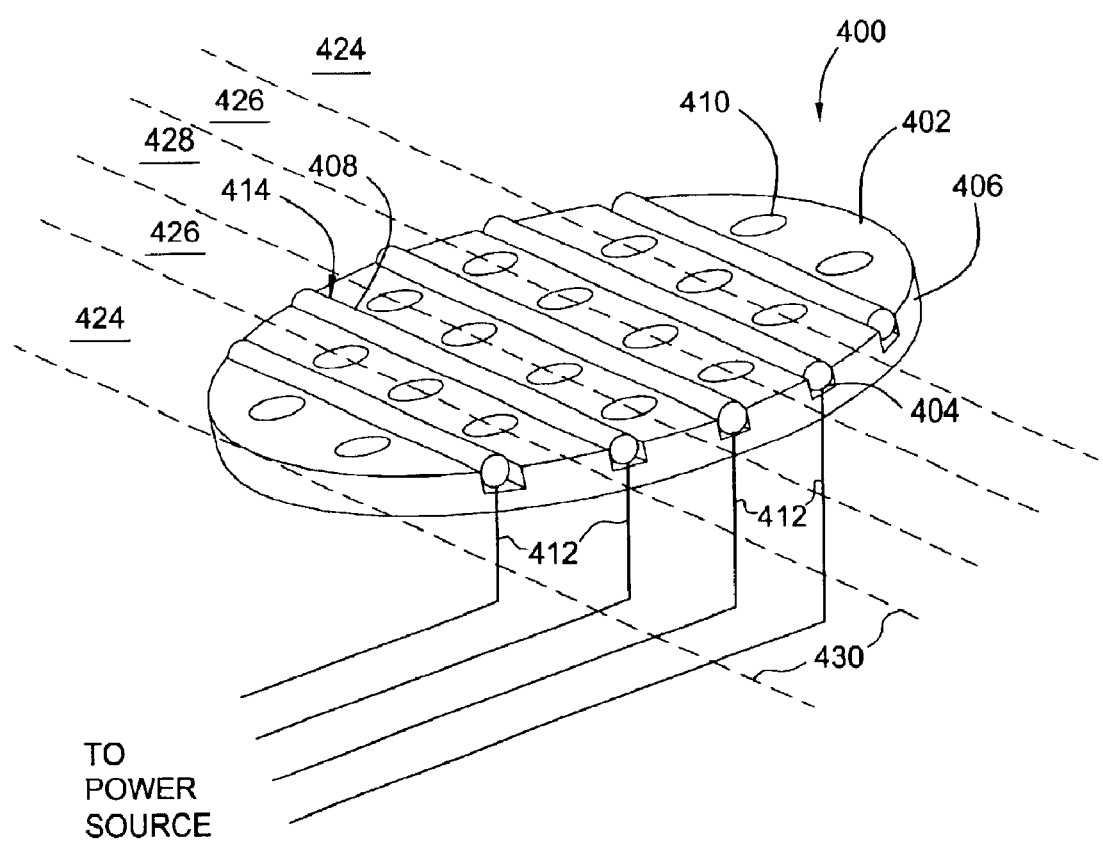
FIG. 3 is a bottom perspective view of one embodiment of a polishing pad that may be used to practice embodiments described herein.

FIG. 3 depicts a bottom perspective view of one embodiment of a pad 400 that may be used to practice embodiments described herein. The pad 400 is a conductive pad comprising a body 406 having a polishing surface 402 adapted to contact the substrate while processing. The polishing surface 402 has a plurality of conductive elements 414, each of which may be formed within a pocket 404 within the polishing surface 402. The conductive elements 414 generally have a contact surface 408 that extends above a plane defined by the polishing surface 402. The contact surface 408 is typically compliant to maximize electrical contact with the substrate without scratching. During polishing, the substrate generally provides a bias force that urges the contact surface 408 into a position co-planar with the polishing surface 402.

The body 406 is generally permeable to the electrolyte by a plurality of perforations 410 such as channels or apertures formed therein. The plurality of perforations 410 allow electrolyte to flow through the body 406 and contact the surface of the substrate during processing. The perforations 410 formed in the conductive pad 400 may include apertures, channels, or holes in the body 406. The aperture size and density is selected to provide uniform distribution of electrolyte, as well as current distribution, through the conductive pad 400 to a substrate surface.

The body 406 of the conductive pad 400 is generally made of a dielectric material. Examples of materials suitable for use in the body 406 include conventional polishing materials typically comprised of polymeric materials, such as polyurethane, polycarbonate, polyphenylene sulfide (PPS), or combinations thereof, and other polishing materials, such as ceramic material, used in polishing substrate surfaces. A conventional polishing media typically comprises polyurethane and/or polyurethane mixed with fillers. Conventional polishing media, such as the Freudenberg FX 9 pad is commercially available from Freudenberg & Company of Weinheim, Germany or the IC-1000 pad commercially available from Rodel Inc., of Phoenix, Ariz. Other conventional polishing materials, such as a layer of compressible material, for example felt leeched in urethane as in a Suba IV polishing pad commercially available from Rodel Inc., of Phoenix, Ariz., may also be utilized for the body 406.

The pockets 404 generally are configured to retain the conductive elements 414 while processing, and accordingly may vary in shape and orientation. In the embodiment depicted in FIG. 5, the pockets 404 are grooves of rectangular cross section and are disposed across the polishing surface 402 coupling two points on the perimeter of the conductive pad 160. Alternatively, the pockets 404 (and conductive elements 414 disposed therein) may be disposed at irregular intervals, be orientated radially, perpendicular and may additionally be linear, curved, concentric, involute curves or other orientation.

Typically, the conductive elements 414 may include conductive polymers, polymer composites with conductive materials, conductive metals or polymers, conductive fillers, graphitic materials, or conductive doping materials, or combinations thereof. The conductive elements 414 generally have a bulk resistivity or a bulk surface resistivity of about 10 $\Omega$-cm or less.

The pad 400 may be characterized as having a plurality of distinct zones such as an outer zone 424, an intermediate zone 426, and an inner zone 428. The zones may correspond in shape and size to the zones of the counter-electrode 166. Each zone may comprise at least one conductive element 414. The zones 424 may have linear boundaries 430, as depicted in FIG. 2. Alternatively, the zones 424 may have radial boundaries 430, or boundaries 430 with other geometries.

One or more connectors 412 couple the conductive elements 414 to the potentiostat or power source 190 to electrically bias the conductive elements 414 while processing. Each zone may have at least one connector 412 in communication with the power source 190. The connectors 412 are generally wires, tapes or other conductors compatible with process fluids or having a covering or coating that protects the connector 412 from the process fluids. The connectors 412 may be coupled to the conductive elements 414 by soldering, stacking, brazing, clamping, crimping, riveting, fastening, conductive adhesive or by other methods or devices. Examples of materials that may be utilized in the connectors 412 include insulated copper, graphite, titanium, platinum, gold, and HASTELOY® among other materials. The connectors 412 may be coated with, for example, a polymer. In the embodiment depicted in FIG. 3, one connector 412 is coupled to each conductive element 414 at the perimeter of the conductive pad 400. Alternatively, the connectors 412 may be disposed through the body 406 of the conductive pad 400.

To facilitate control of polishing uniformity, the microprocessor controller 194, as shown in FIG. 1A may be electrically coupled to the counter-electrode 166 and the pad 160. Software routines may be used to precisely control biases that are applied between the counter electrode 166 and the substrate 104 and/or the pad 160.

While the polishing apparatus described above in FIG. 1A depicts a "face-up" polishing apparatus, it is also within the scope of the invention to use a face-down polishing apparatus in which a substrate is supported face down above a polishing pad.

Figure 1B:
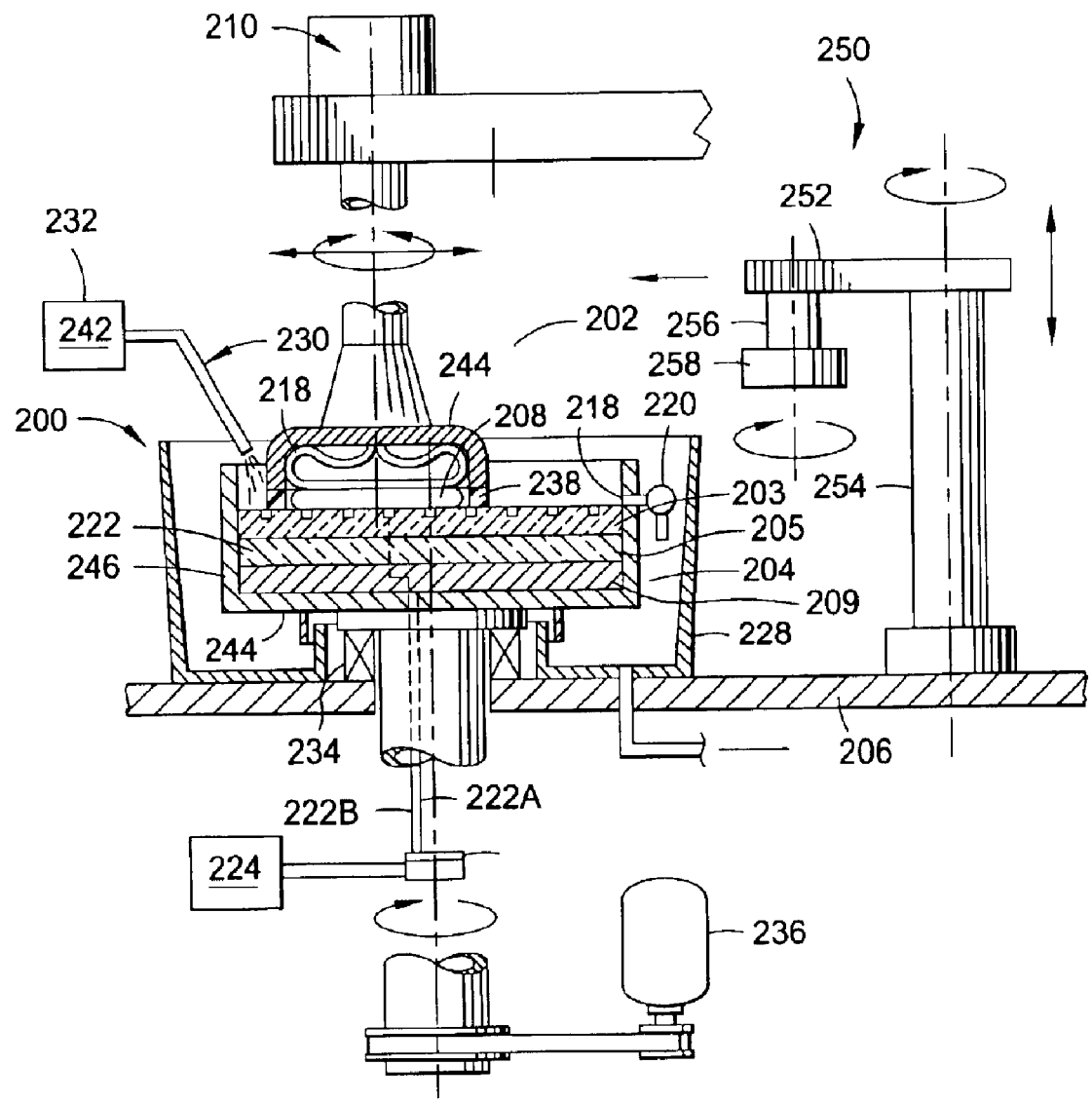
FIG. 1B is a sectional view of another embodiment of a processing cell that may be used to practice embodiments described herein.

FIG. 1B depicts a sectional view of one embodiment of a "face-down" process cell 200. The process cell 200 generally includes a basin 204 and a polishing head 202. A substrate 208 is retained in the polishing head 202 and lowered into the basin 204 during processing in a face-down (e.g., backside up) orientation. An electrolyte is flowed into the basin 204 and in contact with the substrate's surface while the polishing head 202 places the substrate 208 in contact with a pad assembly 222. The substrate 208 and the pad assembly 222 disposed in the basin 204 are moved relative to each other to provide a polishing motion (or motion that enhances plating uniformity). The polishing motion generally comprises at least one motion defined by an orbital, rotary, linear or curvilinear motion, or combinations thereof, among other motions. The polishing motion may be achieved by moving either or both of the polishing heads 202 and the basin 204. The polishing head 202 may be stationary or driven to provide at least a portion of the relative motion between the basin 204 and the substrate 208 held by the polishing head 202. In the embodiment depicted in FIG. 1B, the polishing head 202 is coupled to a drive system 210. The drive system 210 moves the polishing head 202 with at least a rotary, orbital, sweep motion or combinations thereof.

The polishing head 202 generally retains the substrate 208 during processing. In one embodiment, the polishing head 202 includes a housing 214 enclosing a bladder 216. The bladder 216 may be deflated when contacting the substrate to create a vacuum therebetween, thus securing the substrate to the polishing head 202. The bladder 216 may additionally be inflated to press the substrate in contact with the pad assembly 222 retained in the basin 204. A retaining ring 238 is coupled to the housing 214 and circumscribes the substrate 208 to prevent the substrate from slipping out from the polishing head 202 while processing. One polishing head that may be adapted to benefit from the invention is a TITAN HEAD™ carrier head available from Applied Materials, Inc., located in Santa Clara, Calif. Another example of a polishing head that may be adapted to benefit from the invention is described in U.S. Pat. No. 6,159,079, issued Dec. 12, 2001, which is hereby incorporated herein by reference in its entirety.

The basin 204 is generally fabricated from a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing. The basin 204 includes a bottom 244 and sidewalls 246 that define a container that houses the pad assembly 222.

The sidewalls 246 include a port 218 formed there through to allow removal of electrolyte from the basin 204. The port 218 is coupled to a valve 220 to selectively drain or retain the electrolyte in the basin 204.

The basin 204 is rotationally supported above a base 206 by bearings 234. A drive system 236 is coupled to the basin 204 and rotates the basin 204 during processing. A catch basin 228 is disposed on the base 206 and circumscribes the basin 204 to collect processing fluids, such as an electrolyte, that flow out of port 218 disposed through the basin 204 during and/or after processing.

An electrolyte delivery system 232 is generally disposed adjacent the basin 204. The electrolyte delivery system 232 includes a nozzle or outlet 230 coupled to an electrolyte source 242. The outlet 230 flows electrolyte or other processing fluid from the electrolyte source 242 to into the basin 204. During processing, the electrolyte generally provides an electrical path for biasing the substrate 208 and driving an electrochemical process to remove and/or deposit material on the substrate 208. Alternatively, the electrolyte delivery system may provide electrolyte through the bottom 244 of the process cell and flow electrolyte through the pad assembly, including the dielectric insert 207, to contact the polishing pad and substrate.

A conditioning device 250 may be provided proximate the basin 204 to periodically condition or regenerate the pad assembly 222. Typically, the conditioning device 250 includes an arm 252 coupled to a stanchion 254 that is adapted to position and sweep a conditioning element 258 across pad assembly 222. The conditioning element 258 is coupled to the arm 252 by a shaft 256 to allow clearance between the arm 252 and sidewalls 246 of the basin 204 while the conditioning element 258 is lowered to contact the pad assembly 222. The conditioning element 258 is typically a diamond or silicon carbide disk, which may be patterned to enhance working the surface of the pad assembly 222 into a predetermined surface condition/state that enhances process uniformity. One conditioning element 258 that may be adapted to benefit from the invention is described in U.S. patent application Ser. No. 09/676,280, filed Sep. 28, 2000 by Li et al., which is incorporated herein by reference to the extent not inconsistent with the claims aspects and description herein.

A power source 224 is coupled to the pad assembly 222 by electrical leads 212 (shown as 212A–B). The power source 224 applies an electrical bias to the pad assembly 222 to drive an electrochemical process as described further below. The leads 212 are routed through a slip ring 226 disposed below the basin 204. The slip ring 226 facilitates continuous electrical connection between the power source 224 and the pad assembly 222 as the basin 204 rotates. The leads 212 typically are wires, tapes or other conductors compatible with process fluids or having a covering or coating that protects the leads 212 from the process fluids. Examples of materials that may be utilized in the leads 212 include insulated copper, graphite, titanium, platinum, gold, and HASTELOY® materials among other materials. Coatings disposed around the leads 212 may include polymers such as fluorocarbons, PVC, polyamide, and the like.

As the pad assembly 222 includes elements comprising both an anode and cathode of an electrochemical cell, both the anode and cathode may be replaced simultaneously by simply removing a used pad assembly 222 from the basin 204 and inserting a new pad assembly 222 with fresh electrical components into the basin 204.

The pad assembly 222 depicted includes a conductive pad 203 coupled to a backing 205. The backing 205 may be coupled to an electrode 209. Typically, the conductive pad 203, the backing 205, and the electrode 209 are secured together forming a unitary body that facilitates removal and replacement of the pad assembly 222 from the basin 204. Typically, the conductive pad 203, the backing 205, and the electrode 209 are adhered or bonded to one another. Alternatively, the conductive pad 202, the backing 205, and the electrode 209 may be coupled by other methods or combination thereof, including sewing, binding, heat staking, riveting, screwing and clamping among others.

The face-down polishing apparatus is more fully disclosed in U.S. patent application entitled "Method and Apparatus for Substrate Polishing," Ser. No. 10/151,538, filed May 16, 2002 (Attorney Docket No. 6906), commonly assigned and which paragraphs 25–81 are incorporated herein by reference to the extent not inconsistent with the claims aspects and description herein. Similarly to face-up polishing, relative motion is provided between the substrate and the electrode and/or pad.

Method of Polishing

Using embodiments described herein, the polishing uniformity of an ECMP process may be improved by selectively applying an electrical bias to individual zones of a counter-electrode. Referring to FIG. 1A, the substrate 104 is transferred to the support surface 126 of the carrier 116 in a typical lift pin assisted transfer operation. The polishing head 106 is lowered into the basin 102 to place the substrate 104 in contact with the pad 160 or at least proximate thereto. Electrolyte is supplied to the basin 102 and to a level such that the electrolyte may contact the counter-electrode 166, and the pad 160.

The electrolyte used in processing the substrate 104 can include metals such as copper, aluminum, tungsten, gold, silver or other materials that can be electrochemically deposited onto or electrochemically removed from the substrate 104. Electrolyte solutions may include commercially available electrolytes. For example, in copper containing material removal, the electrolyte may include between about 2 and about 30% by volume or weight of sulfuric acid based electrolytes or phosphoric acid based electrolytes, such as potassium phosphate ($K_3PO_4$), phorphoric acid, or combinations thereof. Additionally, the invention contemplates using electrolyte compositions conventionally used in electroplating or electropolishing processes.

The electrolyte may comprise one or more chelating agents, one or more corrosion inhibitors, and one or more pH adjusting agents. The chelating agents may include one or more groups selected from the group consisting of amine groups, amide groups, carboxylate groups, dicarboxylate groups, tri-carboxylate groups, and combinations thereof, for example, ethylenediamine. The chelating agents may be present in a concentration between about 0.1% and about 15% by volume or weight.

The one or more corrosion inhibitors may include an organic compound having azole groups, including benzotriazole, mercaptobenzotriazole, and 5-methyl-1-benzotriazole. The electrolyte composition may include between about 0.01% and about 2.0% by volume or weight of the organic compound having azole groups.

The pH adjusting agents that may be an acid, for example, acetic acid, citric acid, oxalic acid, phosphate-containing components, a base, such as potassium hydroxide (KOH), or combinations thereof, to provide a pH between about 3 and about 10. The electrolyte composition may include, for example, between about 0.2% and about 25% by volume or weight of the one or more pH adjusting agents. The composition may further comprise up to 15% one or more additives selected from the following group: suppressors, enhancers, levelers, inhibitors, brighteners, chelating agents, and stripping agents. An example of a suitable electrolyte is more fully described in U.S. patent application Ser. No. 10/032,275, filed Dec. 21, 2001, which paragraphs 14–40 are incorporated herein incorporated by reference to the extent not inconsistent with the claims aspects and description herein The electrolyte flow rate is typically constant, for example between about 0.1 gallons per minute (GPM) and about 20 GPM, but may vary according to the desires of the operator. Additionally, the invention contemplates that the electrolyte may be introduced from multiple inlets to provide variable electrolyte flow rates over portions of the substrate surface.

Figure 4:
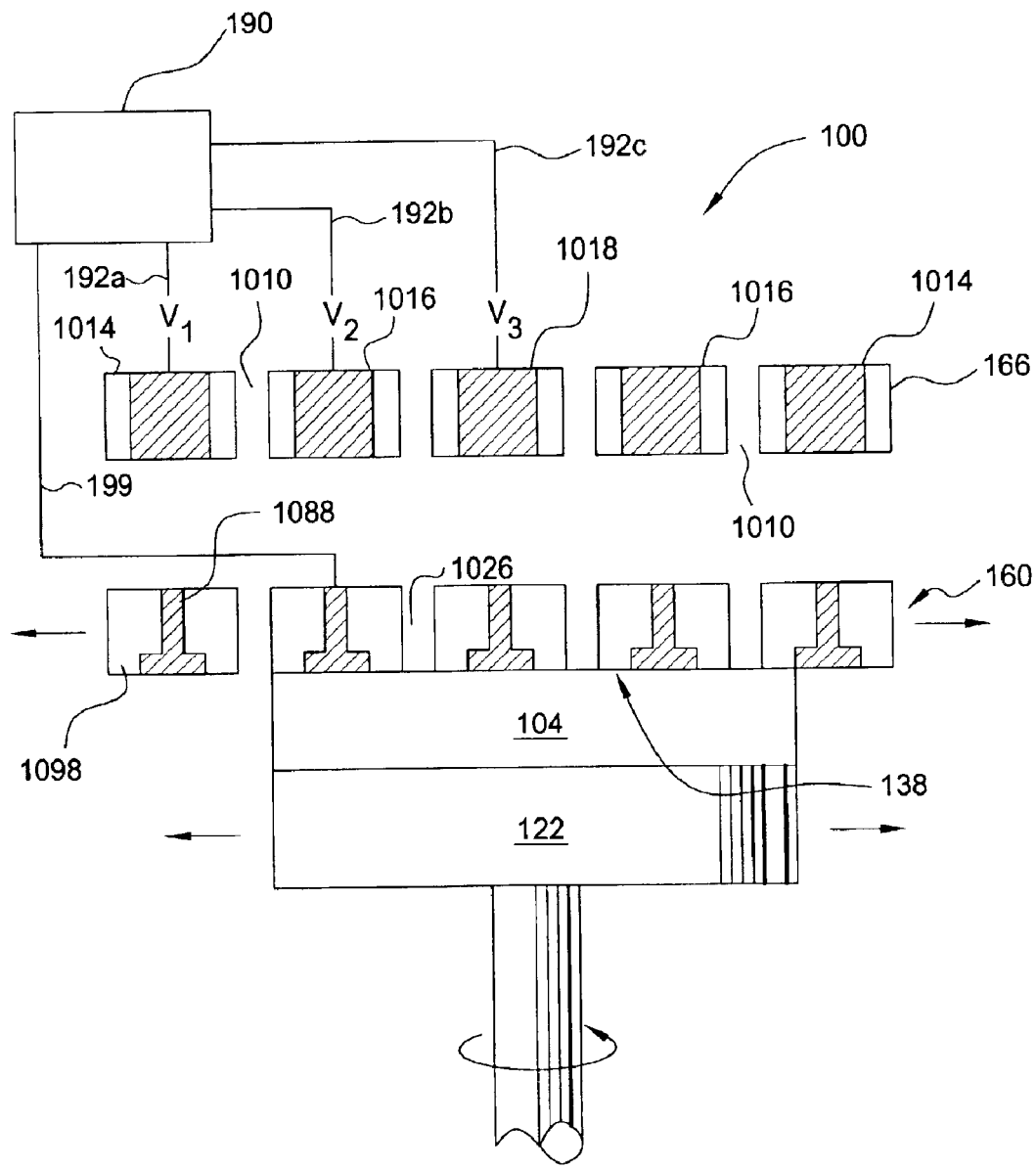
FIG. 4 is a sectional view of a process cell depicting a material layer being polished using embodiments of the invention described herein.

FIG. 4 is a sectional view of the process cell 100 that may be used to practice a polishing method consistent with embodiments of the invention described herein. Referring to FIG. 4 and to FIG. 1A, the substrate 104 disposed on the substrate support 122 and the pad 160 may be moved (e.g. rotated, translated, orbited, etc.) relative to one another to polish the surface 138 of the substrate 104. The counter electrode 166 is generally moved along with the pad 160. The counter electrode 166 comprises a plurality of zones. An outer zone 1014, an intermediate zone 1016, and an inner zone 1018 are shown by way of example in FIG. 4. The counter-electrode 166 has optional perforations 1010 formed therethrough. The counter-electrode 166 is positioned, for example, proximate to the pad 160 during polishing.

Power from the potentiostat or power source 190 may be applied to the pad 160 and the counter-electrode 166 through electrical leads to provide a bias therebetween. Three leads 192a, 192b, 192c connected to the respective zones 1014, 1016, 1018 of the counter electrode 166 and the power source 190 are shown by way of example in FIG. 4. A lead 199 is connected to the pad 160 through one or more conductive elements 1088 formed in the pad 160. Each conductive element may have an individual lead and a series of conductive elements may be connected to the same lead as desired by the operator. The one or more conductive elements 1088 may have a surface that is substantially coplanar with a polishing surface 1098 of the pad 160. While the description herein for the power source 190 indicates one power source, the invention contemplates that a plurality of power sources may be used including an individual power source for each lead or conductive element in the processing cell 100, 200.

The polishing motion may be applied before, after, or simultaneously with the application of the electrical bias. When contacting the surface 138 of the substrate 104, the pad 160 typically applies a pressure of about 2 psi or less, such as between about 0.01 psi and about 0.5 psi, for example, about 0.2 psi, to the substrate surface. The relative motion between the pad 160 and the substrate 104 may include rotational, linear or curvilinear motion, orbital motion or combinations thereof, among other motions.

In anodic dissolution, the bias may be applied to the counter-electrode 166, performing as a cathode, and the substrate 104 (as well as the conductive pad, for embodiments in which a conductive pad is used) performing as the anode. The application of the bias allows removal of deposited material from the substrate surface. In an exemplary polishing process, a first bias, V1 is applied via the potentiostat or power source 190 between the outer zone 1014 of the counter-electrode 166, performing as a cathode, and the pad 160, performing as the anode. Similarly, a second bias, V2 is applied between the intermediate zone 1016 of the counter-electrode 166 and the pad 160. A third bias, V3 is applied between the inner zone 1018 of the counter-electrode 166 and the pad 160. The application of the first bias V1, the second bias V2, and the third bias V3 urges removal of material from the surface 138 of a material layer. Each bias V1, V2, and V3, may include the application of a voltage of about 10 volts or less to the surface 138 of the substrate 104.

Generally the bias is applied to provide a current density between about 0.1 milliamps/cm$^2$ and about 50 milliamps/ cm², or between about 0.1 amps to about 20 amps for a 200 mm substrate. By varying the bias applied between each zone of the counter electrode 166 and the substrate 104, the rate of material removal from the substrate surface 138 may be varied. For example, a bias of a voltage of about 15 volts or less, such as between 1 volt and 15 volts, including between about 2 and about 6 volts, to a surface of the substrate 104 may be used with the processes described herein for 200 mm and 300 mm substrates. Additionally, each bias may be zero or "off" for a portion or all of a planarizing process. Further, the voltages described herein may be the voltages applied prior to any mechanical polishing and may be the voltages applied during mechanical polishing as described as follows.

To facilitate the selection of appropriate values for V1, V2, and V3, a relationship between a rate of removal of material from the substrate surface 138 to be polished and a bias applied between the counter-electrode 166 and the substrate surface is utilized. The relationship may be a mathematical or statistical relationship such as a functional relationship.

The relationship between removal rate and bias may be determined emperically, for example, by polishing a plurality of test material layers 105 using a process cell such as the process cell 100. The test material layers 105 may be polished according to a specific set of instructions that is communicated via software to the controller 194. The controller 194 relays the set of instructions to components of the process cell 100. The set of instructions may comprise providing relative motion between the pad 160 and the substrate 104. The relative motion may be, for example, linear, rotational, orbital, or combinations thereof. A test bias, $V_t$ is applied between the test material layer 105 and the counter electrode 166. The test bias, $V_t$, may be applied such that a substantially uniform potential is generated across the counter electrode 166 with respect to the surface 138 to be polished. The bias may be applied to the test material layer 105 using, for example, a pad such as the pad 160 described above.

Figure 5A:
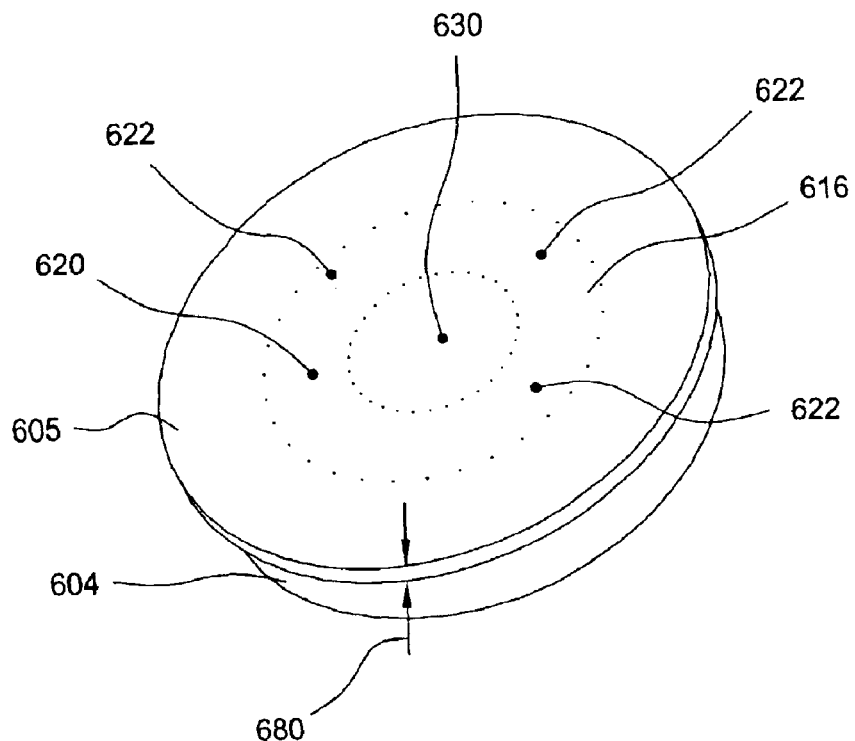
FIGS. 5A–5B are top perspective views of a substrate having a material layer thereon, wherein the material layer may be polished in order to develop a relationship between removal rate and applied bias, consistent with embodiments described herein.
Figure 5B:
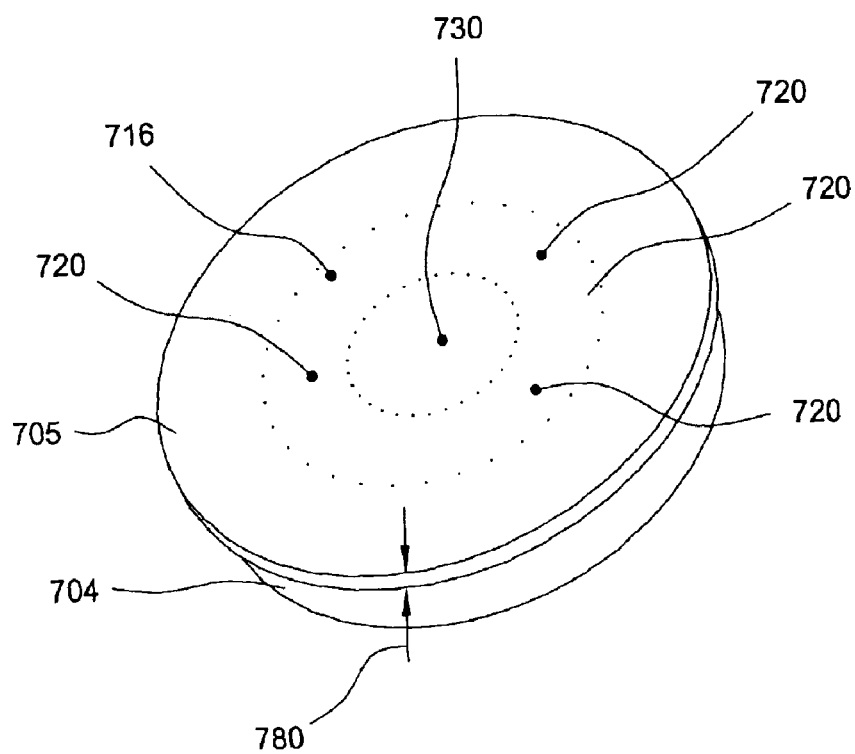

For example, referring to FIG. 5A, a top perspective view of a substrate 604 shows a first test material layer 605 formed thereon. Similarly, FIG. 5B shows a second substrate 704 having a second test material layer 705 formed thereon. The first test material layer 605 is polished by applying a first test bias such as a uniform test bias across the test material layer 605 relative to the counter electrode 166.

After polishing the test material layer 605 for a predetermined period of time (a first polishing time), the substrate 604 is, for example, removed from the process cell 100 and an amount of material removed from the test material layer 605 is then measured. The amount of material removed may be determined, for example, using conventional methods of measuring layer thicknesses, such as sheet resistance (Rs) measurements. Alternatively, the amount of material removed may be measured using electron microscopy, or similar methods for analyzing thickness and composition of material layers. The material removal may be determined by measuring a thickness 680 of the test material layer 605 before polishing and the thickness 680 after polishing. The thickness 680 may be measured at a first point 620. Additional thickness measurements of the first test material layer 605 may be taken at one or more additional points 622 in order to obtain a statistically representative value for material removal. Alternatively, a property other than thickness may be measured. For example, a mass of material removed or a material removal rate may be measured directly or indirectly. The one or more additional points 622 on the test material layer 605 may be chosen such that the points lie within a region or zone of the test material layer 605 that experiences a relatively uniform rate of polishing (material removal). For example, the first point 620 and the additional points 622 may be chosen such that they all lie in an intermediate region 616 of the test material layer 605. Alternatively, the first point 620 and the additional points 622 may be chosen such that they each are a distance from a center 630 of the test material layer 605 that is substantially the same. A first rate of material removal may be determined by, for example, dividing mass or thickness of the material removed by the first polishing time.

The second test material layer 705 may be polished using the same geometry and configuration of the cell 100 as for the polishing of the first test material layer 605. The second test material layer 705 may be polished by applying a second bias applied to the second test material layer 705. Thereafter, the step of determining material removal may be performed for one or more points 720 on the second test material layer 705. Furthermore, the process of determining removal rate may be repeated for additional test material layers (not shown), if desired.

The one or more points 720 on the test material layer 705 may lie within a region such as an intermediate region 716 of the material layer 105. The intermediate region 716 may have a similar shape and define a similar range of distances from a center 730 of the material layer 705 as is defined by the intermediate region 616 with respect to the center 630.

By matching the material removal from each test material layer 605, 705 with the corresponding bias applied to the test material layer, a relationship, such as a mathematical relationship between rate of material removal and bias may be determined. The relationship thus determined may be relevant for a specific configuration of the process cell 100, including a specific polishing composition as well as specific composition of material layer. Therefore, the relationship between material removal and bias may be used to determine optimal bias voltages to be applied when polishing a material layer using a process cell that has a similar geometry/polishing composition to the process cell 100 used to polish the test material layers 605, 705. The relationship may be a linear relationship, an exponential relationship, or other mathematical relationship as determined between the rate of material removal and any applied bias. The mathematical relationship may also be modified or adjusted to compensate for any effects of the type, shape, geometry, or limitations of the processing cell on the processes being performed therein.

Figure 6A:
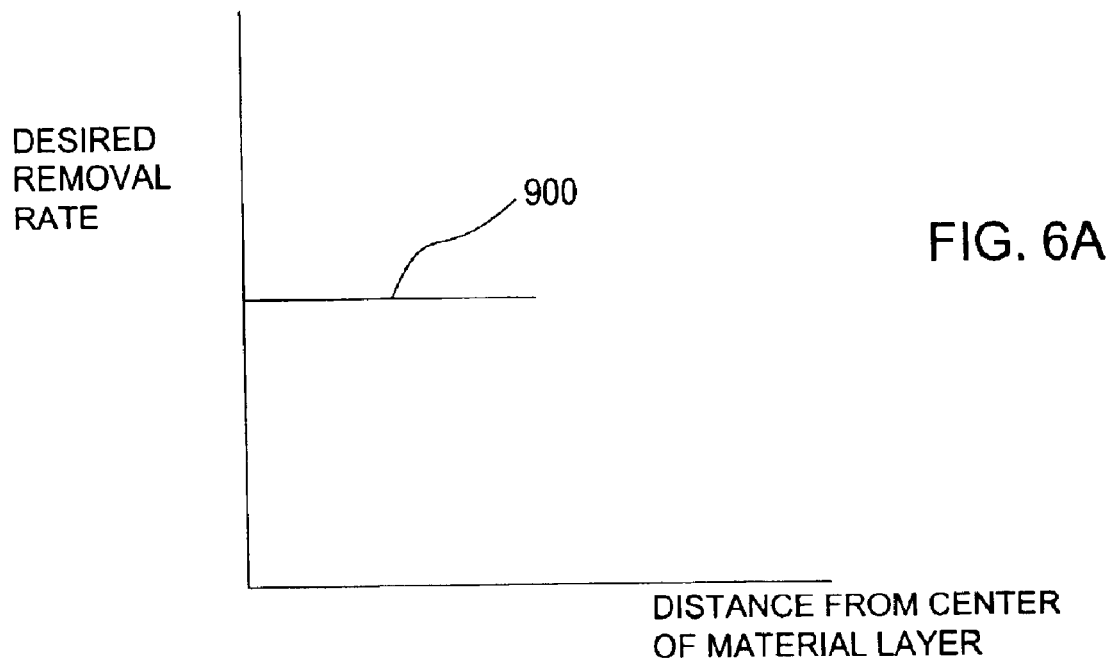
FIGS. 6A–6B depict two different removal rate profiles that may be generated using embodiments described herein.

Referring again to FIG. 5, after determining the relationship between bias and rate of material removal, a set of biases V1, V2, V3 that may be desirably applied between the zones 1014, 1016, 1018 of the counter-electrode 166 and the material layer 105 are determined. The set of desirable biases V1, V2, V3 may be selected in order to generate a pre-determined removal profile, i.e. generate a separate rate of material removal for different regions of the material layer 105. For example, FIG. 6A shows one example of a removal profile 900 that may be desirably generated. The removal profile 900 is substantially uniform across the material layer 105 to be polished (i.e. does not vary across surface 138 of the material layer 105, such as, for example, vary with a distance from a center such as the center 630 of the test material layer 105 shown in FIG. 4A).

Figure 6B:
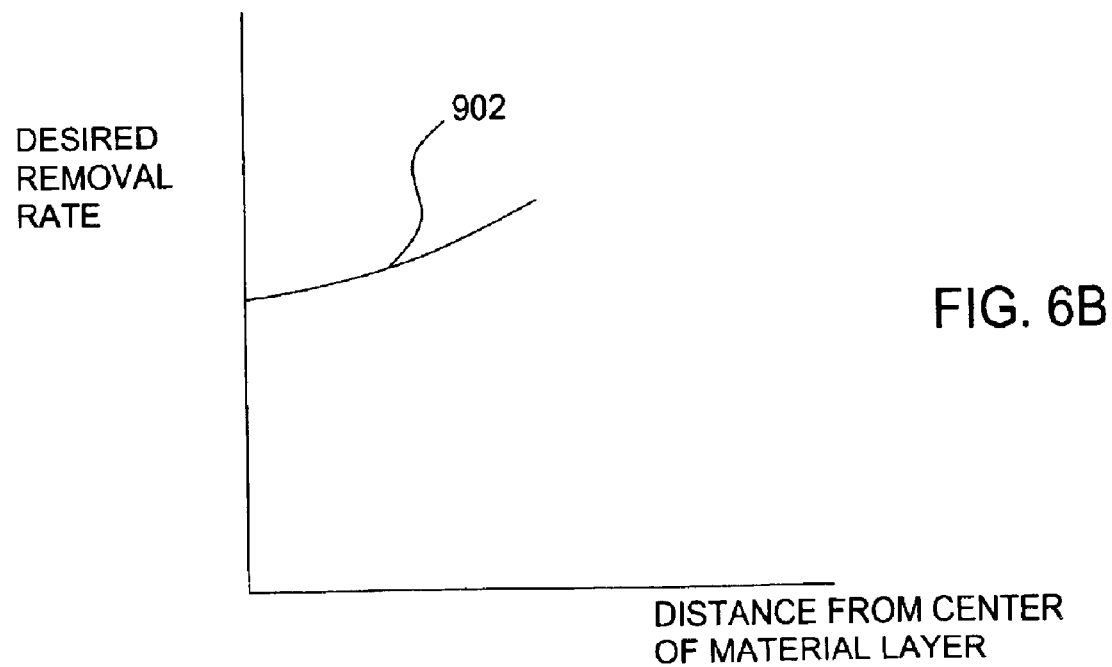
Figure 7:
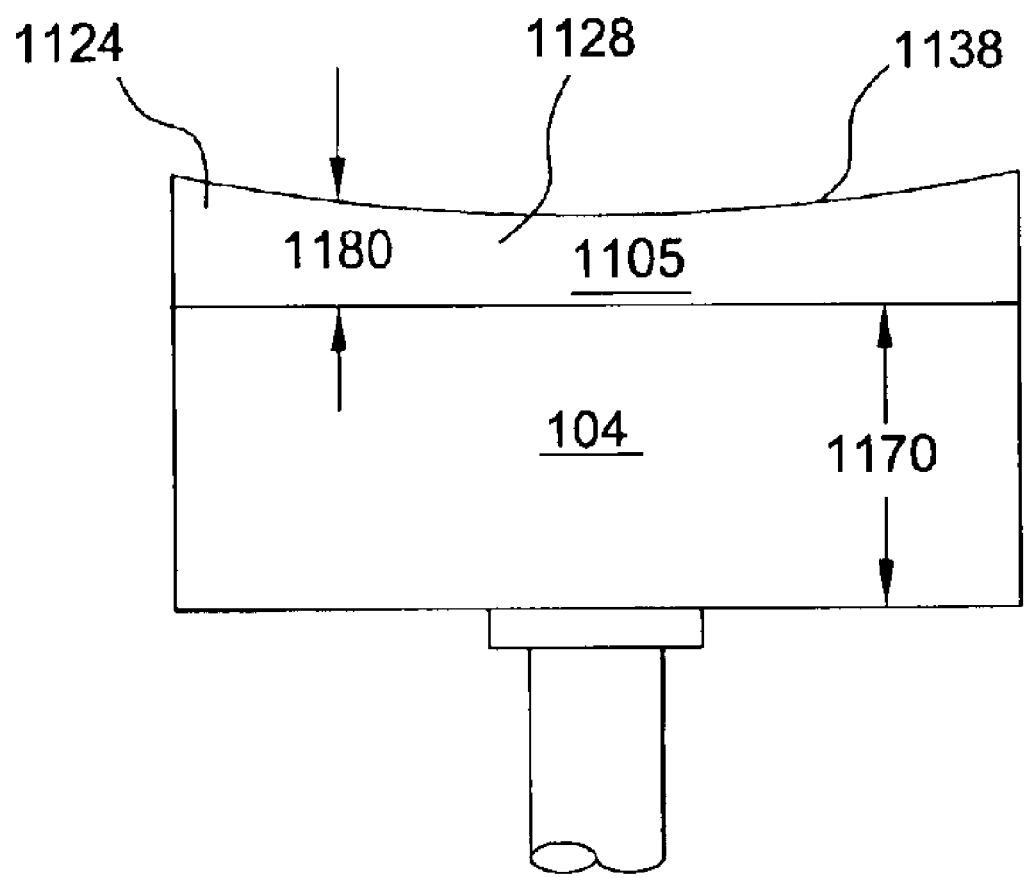
FIG. 7 is a schematic, cross-sectional view of a material layer that may be polished using embodiments described herein.

In an alternative embodiment of the invention, as shown in FIG. 6B, the set of biases V1, V2, V3 are selected to generate a removal profile 902 that varies across the surface 138 to be polished. The alternative embodiment depicted in FIG. 6B, may be employed, for example, in cases in which the surface 138 of the substrate 104 and/or material layer 105 is irregular (e.g. either the substrate 104 or the material layer 105 is bowed, warped, uneven, not flat, or otherwise has a variable thickness). For example, FIG. 7 shows a cross-sectional view of the substrate 104 having a material layer 1105 formed thereon, wherein the material layer 1105 has a thickness 1180 that varies substantially across the surface 1138 to be polished). By applying biases that generate the non-uniform removal profile 902, material can be removed more rapidly from, for example, an edge region 1124 of the material layer 1105 than for a center region 1128.

For a known set of biases, V1, V2, V3 applied to zones of the counter-electrode 166, a corresponding set of removal rates, R1, R2, R3, can be estimated, calculated, or modeled using the pre-determined relationship, between applied bias and removal rate. The removal rates R1, R2, R3, associated with the zones of the counter-electrode 166 can be used to determine removal rates that will be experienced by the material layer to be polished. Optimal values for biases V1, V2, V3 can be determined using techniques described below.

The material layer 105 is polished, for example, by providing a predetermined set of instructions to the components of the process cell 100 using the controller 194. The predetermined set of instructions defines a specific sequence of relative motion between the pad 160 and the substrate 104. Using an appropriate algorithm, the location of any point on the material layer 105 as a function of time relative to the pad 160 can be calculated. Furthermore, the amount of time that any point on the material layer 105 is associated with each zone of the counter electrode 166 may also be determined by the algorithm. Because each zone of the pad 160 has a removal rate that is a function of the bias applied to that zone, it can therefore be determined the amount of time that any point on the material layer 105 is associated with each removal rate. The removal rate for any point on the material layer 105 can then be calculated as, for example, as an average of the removal rates of each zone, wherein the average is weighted by the amount or fraction of time that the point on the material layer 105 spends in each zone. In general, the material layer 105 may be polished in the process cell 100 used to polish the test material layers 605, 705. Alternatively, the material layer 105 may be polished in a process cell having similar geometry (e.g., substantially similar size and shape at the counter-electrode 166, a substantially similar distance between the counter-electrode 166 and the substrate 104, and the like).

Exemplary Polishing Method

A counter-electrode such as the counter-electrode 166 was divided into five zones: an inner zone, an inner-central zone, a central zone, an outer-central zone and an outer zone (Z1, Z2, Z3, Z4 and Z5) respectively. The zones were arranged in a concentric circular manner similar to the zones depicted for the counter-electrode 166 shown in FIG. 2. Each of the zones was capable of receiving a separate bias with respect to a material layer to be polished. One hundred twenty one points, representing a broad sampling of various locations on the material layer were selected. A pre-determined set of instructions (i.e., a polishing program) that encoded a sequence of relative motion between the counter-electrode 166 (as well as the pad 160) and the material layer 105 was provided to controller 194. An algorithm based on the polishing program was used to determine the sequence of relative positions between the material layer 105 and the counter-electrode 166 as a function of time throughout the polishing process. The algorithm calculated the location of each point relative to the five zones of the counter-electrode 166 for each of a total of 2400 instants in time (time steps). The algorithm also calculated the number of time steps each point was associated with each of the five zones (e.g. the number of times the point would be facing or under each of the zones of the counter-electrode 166). Note that for embodiments in which the process cell 100 comprises the pad 160, a point on the material layer 105 only experiences a bias when the point on the material layer 105 is facing a perforation 410 in the pad 160. If the point is not facing a perforation 410 in the pad 160, no bias will be experienced by the point on the material layer 105.

Based upon the program to be used to polish the material layer, the algorithm determined that a first point in the center of the material layer was associated with Z2 for 1080 time steps (i.e. 45% of the total number of time steps), associated with Z1, Z3, Z4, Z5 for 0 time steps, and associated with none of the zones (i.e., the point was not under a perforation 1010 in the pad and therefore zero bias was experienced by the point) for the remaining 1320 time steps. Therefore, for 45% of time, point A was associated with Z2, and the expected removal rate would be 0.45×R2.

From the algorithm it was further determined that a second point B, away from the center of the material layer) was associated with Z2 for 570 time steps (or 23.75% of the total number of time steps), associated with Z3 for 774 time steps (or 32.35% of the total number of time steps), and associated with no zones (i.e., not under a perforation in the pad) for 1056 time steps. The expected removal rate for point B is therefore given by an average of the removal rates for Z1, Z2, Z3, Z4, and Z5, weighted by the percentage of the time spent in each zone. Expressed in mathematical terms, the expected removal rate for point B is given by the mathematical expression, [0.2375×R2]+[0.3235×R3].

The algorithm further calculated the expected removal rate for the remainder of the 121 points on the material layer in a similar manner. Specifically, for each point an expected removal rate was calculated as [A1×R1]+[A2×R2]+[A3×R3]+[A4×R4]+[A5×R5]. A1, A2, A3, A4, and A5 are the percentage of times that the particular point was associated with the zones Z1, Z2, Z3, Z4, and Z5 respectively.

The material layer to be polished had a non-uniform surface to be polished. In order to compensate for the non-uniform surface 138, the desired removal profile was similar to the removal profile 902, shown in FIG. 7B. A least-squares regression was performed to optimize the values for R1, R2, R3, R4, and R5 such that the removal profile of the material layer 105 after polishing would closely match the desired removal profile. The optimal biases to be applied to each of the zones was then determined using a pre-determined (linear) relationship between removal rate and bias (specifically bias in volts equals removal rate in thousands of Angstroms per minute). The results of the regression and the assumption of the linear relationship between bias and removal rate yielded a value of V1 of 2.0222 volts, a value of V2 of 1.8569 volts a value of V3 of 2.0028 volts, and a value of V4 of 3.7397 volts a value of V5 of 6.7937 volts. The material layer 105 was polished using these biases and the resultant removal profile was similar to the desired removal profile.

While FIG. 5 depicts the use of the counter-electrode 166 that is divided into three radial zones, each of which may be separately biased with respect to the material layer 105, other pad configurations are possible. The counter-electrode 166 may be divided into zones of any number greater than one. Similarly, the zones of the counter-electrode 166 need not be radial as depicted in FIG. 4. The zones may be may be of any geometrical configuration, such as, for example, linear sections.

Furthermore, in addition to the counter-electrode 166, one or more reference electrodes may be used to apply the separate biases to the material layer 105. Examples of methods that may be used to apply a plurality of biases between one or more electrodes and a material layer to be polished are provided in the previously cross-referenced, co-pending U.S. patent application entitled "Control Of Removal Profile In Electrochemically Assisted CMP", commonly assigned with the present invention and herein incorporated by reference to the extent not inconsistent with the claims aspects and description herein.

While the method described above is discussed in the context of an electrochemical-mechanical polishing (ECMP) process, the invention contemplates using the method in other fabrication processes involving electrochemical activity. Examples of such processes using electrochemical activity include electrochemical deposition, which involves a pad 160 being used to apply a uniform bias to a substrate surface for depositing a conductive material without the use of a conventional bias application apparatus, such as edge contacts, and electrochemical mechanical plating processes (ECMPP) that include a combination of electrochemical deposition and chemical mechanical polishing.

While the foregoing is directed to various embodiments of the invention, other and further embodiments of the invention may be devised without departing from the basic scope thereof, and the scope thereof is determined by the claims that follow.

What is claimed is:

1. A method of processing a substrate, comprising:
    disposing a substrate having a conductive material layer formed thereon in a process apparatus comprising an electrode having a plurality of zones;
    contacting the substrate with a polishing pad;
    moving the substrate relative to the plurality of zones with at least one portion of the substrate passing through more than one zone of the plurality of zones;
    applying a bias between the substrate and each of the plurality of zones, wherein the bias to each of the plurality of zones is modified by the time that the at least one portion of the substrate is associated with more than one zone of the electrode; and
    removing conductive material from the conductive material layer.

2. The method of claim 1, further comprising determining a substrate removal rate profile by determining the removal rates for each of the plurality of zones by application of one or more test biases for each of the plurality of zones.

3. The method of claim 2, wherein the determining the removal rates for each of the plurality of zones by application of one or more test biases for each of the plurality of zones is achieved by measuring a property of the one or more polished test material layers selected from the group consisting of material removal, rate of material removal, layer thickness, and combinations thereof.

4. The method of claim 2, wherein the bias is modified by the substrate removal rate profile to remove conductive material at a rate that varies for each of the plurality of zones.

5. The method of claim 4, wherein the bias is modified by the substrate removal rate profile to remove conductive material at a rate that varies for each of the plurality of zones to provide a substantially uniform removal profile or a substantially non-uniform removal profile to planarize the substrate surface.

6. The method of claim 4, wherein the substrate removal rate profile compensates for a variation in thickness of the material layer on the substrate, compensates for a variation in thickness of the substrate, or both.

7. The method of claim 1, wherein the polishing pad comprises a conductive polishing material, one or more conductive elements disposed in a polishing material, or a plurality of zones with each zone having at least one conductive element.

8. The method of claim 1, wherein the contacting the substrate with a polishing pad comprises providing relative motion between the polishing pad and the substrate.

9. The method of claim 1, wherein the substrate is contacted with the polishing pad at a pressure of about 0.5 psi or less.

10. A method of processing a surface of a substrate, comprising:
    disposing the substrate having a conductive material layer formed thereon in a process apparatus comprising an electrode having a plurality of zones and a polishing pad having a plurality of zones corresponding to the plurality of zones of the electrode;
    contacting the polishing pad and the substrate;
    providing relative motion between the polishing pad and the substrate; and
    separately applying a plurality of biases between the plurality of zones of the polishing pad and the plurality of zones of the counter-electrode, wherein the plurality of biases removes conductive material from the conductive material layer at a rate that varies for each of the plurality of zones of the polishing pad and the plurality of biases of the plurality of zones of the polishing pad provides a plurality of biases to the substrate when contacting the substrate.

11. The method of claim 10, wherein the plurality of biases removes conductive material from the conductive material layer at a rate that varies for each of the plurality of zones to provide a substantially uniform removal profile or a substantially non-uniform removal profile to planarize the substrate surface.

12. The method of claim 10, wherein the polishing pad has a plurality of perforations formed therethrough.

13. The method of claim 10, wherein applying a plurality of biases between the plurality of zones of the polishing pad and the plurality of zones of the counter-electrode compensates for a variation in thickness of the material layer, compensates for a variation in thickness of the substrate, or both, to planarize the substrate surface.

14. The method of claim 10, further comprising determining a time that at least one portion of the substrate is associated with each of the plurality of zones of the electrode, each of the plurality of zones of the polishing pad, or both.

15. The method of claim 14, wherein applying a plurality of biases between the plurality of zones of the polishing pad and the plurality of zones of the counter-electrode compensates for a variation in the time that at least one portion of the substrate is associated with each of the plurality of zones of the electrode, each of the plurality of zones of the polishing pad, or both, to planarize the substrate surface.

16. The method of claim 10, further comprising determining a distribution of times that at least one portion of the substrate is associated with each of the plurality of zones of the electrode, each of the plurality of zones of the polishing pad, or both.

17. The method of claim 16, wherein applying a plurality of biases between the plurality of zones of the polishing pad and the plurality of zones of the counter-electrode compensates for a variation in the distribution of times that at least one portion of the substrate is associated with each of the plurality of zones of the electrode, each of the plurality of zones of the polishing pad, or both, to planarize the substrate surface.

18. The method of claim 1, wherein the method of processing the substrate comprise instructions disposed in a computer readable medium that, when executed causes a general purpose computer to control a process cell to perform the method.

19. The method of claim 10, wherein the method of processing the substrate comprise instructions disposed in a computer readable medium that, when executed causes a general purpose computer to control a process cell to perform the method.

20. The method of claim 10, wherein the substrate is contacted with the polishing pad at a pressure of about 0.5 psi or less.

* * * * *